(12) United States Patent
Worsley et al.

(10) Patent No.: US 9,069,744 B2
(45) Date of Patent: *Jun. 30, 2015

(54) EXTENSIBLE FRAMEWORK FOR EREADER TOOLS, INCLUDING NAMED ENTITY INFORMATION

(75) Inventors: Frank R. Worsley, San Francisco, CA (US); Tania Bedrax-Weiss, Sunnyvale, CA (US); Abraham Murray, Scituate, MA (US); Dana L. Dickinson, San Jose, CA (US); Gopal Venu Vemula, San Ramon, CA (US); Kirill Buryak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/472,185

(22) Filed: May 15, 2012

(65) Prior Publication Data

US 2013/0311870 A1  Nov. 21, 2013

(51) Int. Cl.
*G06F 17/21* (2006.01)
*G06F 17/24* (2006.01)
(Continued)

(52) U.S. Cl.
CPC ............ *G06F 17/241* (2013.01); *G06F 17/217* (2013.01); *G06F 17/278* (2013.01);
(Continued)

(58) Field of Classification Search
CPC ... G06F 17/241; G06F 17/242; G06F 17/278; G06F 17/30011; G06F 17/30643; G06F 17/30719; G06F 17/30728; G06F 17/30952; G06F 17/30955
USPC .......... 715/209, 230–232, 705, 712, 764, 776
See application file for complete search history.

(56) References Cited

U.S. PATENT DOCUMENTS

| | | |
|---|---|---|
| 5,392,387 A | 2/1995 | Fitzpatrick et al. |
| 5,877,765 A | 3/1999 | Dickman et al. |

(Continued)

FOREIGN PATENT DOCUMENTS

| | | |
|---|---|---|
| JP | 2008-033945 A | 2/2008 |
| KR | 10-2002-0006129 A | 1/2002 |

(Continued)

OTHER PUBLICATIONS

PCT International Search Report and Written Opinion, PCT/US2012/034810, Jul. 29, 2013, 8 Pages.

(Continued)

*Primary Examiner* — Wilson Tsui
(74) *Attorney, Agent, or Firm* — Fenwick & West LLP

(57) ABSTRACT

Information about named entities referenced in an electronic book (ebook) is provided to a client device. An ebook identifier identifying the ebook is received from the client device. A set of layers available for use with the ebook is determined. The layers in the set provide information associated with the ebook and a layer in the set provides information associated with named entities referenced in content of the ebook. A content range identifying a range of content of the ebook for which layer information is requested and an identification of one or more of the layers in the set for which layer information is requested is received from the client device. Layer information associated with the ebook content identified by the content range for the identified layers is transmitted to the client device. The transmitted layer information includes information associated with named entities referenced by ebook content.

20 Claims, 5 Drawing Sheets

(51) Int. Cl.
*G06F 17/27* (2006.01)
*G06F 17/30* (2006.01)
*G06F 17/28* (2006.01)

(52) U.S. Cl.
CPC .... *G06F17/30952* (2013.01); *G06F 17/30955* (2013.01); *G06F 17/30643* (2013.01); *G06F 17/30728* (2013.01)

(56) References Cited

U.S. PATENT DOCUMENTS

| | | | |
|---|---|---|---|
| 6,181,344 | B1 | 1/2001 | Tarpenning et al. |
| 6,340,967 | B1 | 1/2002 | Maxted |
| 6,438,564 | B1 | 8/2002 | Morton et al. |
| 6,590,568 | B1 | 7/2003 | Astala et al. |
| 6,704,733 | B2 | 3/2004 | Clark et al. |
| 6,907,407 | B1* | 6/2005 | Yamanoue et al. ............. 705/57 |
| 6,957,233 | B1 | 10/2005 | Beezer et al. |
| 6,980,652 | B1 | 12/2005 | Braitberg et al. |
| 7,020,654 | B1* | 3/2006 | Najmi ................... 1/1 |
| 7,058,902 | B2 | 6/2006 | Iwema et al. |
| 7,139,977 | B1 | 11/2006 | Russell |
| 7,236,966 | B1 | 6/2007 | Jackson et al. |
| 7,496,856 | B2 | 2/2009 | Beezer et al. |
| 7,545,940 | B2* | 6/2009 | Alessi et al. ................... 380/239 |
| 7,546,524 | B1 | 6/2009 | Bryar et al. |
| 7,779,347 | B2 | 8/2010 | Christiansen et al. |
| 7,873,588 | B2 | 1/2011 | Sareday et al. |
| 8,131,647 | B2 | 3/2012 | Siegel et al. |
| 8,239,574 | B2 | 8/2012 | Keum et al. |
| 8,352,449 | B1* | 1/2013 | Parekh et al. ................. 707/705 |
| 8,478,662 | B1* | 7/2013 | Snodgrass et al. ........... 705/26.7 |
| 8,504,906 | B1 | 8/2013 | Xu |
| 8,706,685 | B1* | 4/2014 | Smith et al. ................... 707/608 |
| 8,799,765 | B1 | 8/2014 | MacInnis et al. |
| 2002/0073177 | A1 | 6/2002 | Clark et al. |
| 2002/0082939 | A1 | 6/2002 | Clark et al. |
| 2002/0087560 | A1 | 7/2002 | Bardwell |
| 2004/0162846 | A1 | 8/2004 | Nakahara et al. |
| 2004/0201633 | A1 | 10/2004 | Barsness et al. |
| 2004/0205568 | A1 | 10/2004 | Breuel et al. |
| 2004/0267527 | A1 | 12/2004 | Creamer et al. |
| 2005/0132281 | A1 | 6/2005 | Pan et al. |
| 2005/0154760 | A1 | 7/2005 | Bhakta et al. |
| 2005/0193330 | A1 | 9/2005 | Peters |
| 2006/0053364 | A1 | 3/2006 | Hollander et al. |
| 2007/0080500 | A1 | 4/2007 | Kano |
| 2007/0083906 | A1 | 4/2007 | Wellingkar |
| 2007/0118794 | A1 | 5/2007 | Hollander et al. |
| 2007/0136657 | A1 | 6/2007 | Blumenthal et al. |
| 2007/0300200 | A1 | 12/2007 | Holm et al. |
| 2008/0066185 | A1 | 3/2008 | Lester et al. |
| 2008/0141182 | A1 | 6/2008 | Barsness et al. |
| 2008/0168073 | A1 | 7/2008 | Siegel et al. |
| 2008/0222552 | A1 | 9/2008 | Batarseh et al. |
| 2008/0229182 | A1 | 9/2008 | Hendricks et al. |
| 2008/0229190 | A1 | 9/2008 | Johnson |
| 2008/0243991 | A1 | 10/2008 | Ryan et al. |
| 2008/0293450 | A1 | 11/2008 | Ryan et al. |
| 2008/0294674 | A1 | 11/2008 | Reztlaff et al. |
| 2009/0063157 | A1* | 3/2009 | Seo .............................. 704/270 |
| 2009/0125413 | A1 | 5/2009 | Le Chevalier et al. |
| 2009/0187842 | A1 | 7/2009 | Collins et al. |
| 2010/0017701 | A1 | 1/2010 | Bargeron et al. |
| 2010/0088746 | A1 | 4/2010 | Kota et al. |
| 2010/0161653 | A1 | 6/2010 | Krasnow |
| 2010/0315359 | A1 | 12/2010 | Seong et al. |
| 2010/0324895 | A1 | 12/2010 | Kurzweil et al. |
| 2011/0029435 | A1 | 2/2011 | Ronen et al. |
| 2011/0123967 | A1 | 5/2011 | Perronnin et al. |
| 2011/0167350 | A1* | 7/2011 | Hoellwarth ................... 715/727 |
| 2011/0202606 | A1 | 8/2011 | Agarwal et al. |
| 2011/0227949 | A1 | 9/2011 | Kung et al. |
| 2011/0246502 | A1 | 10/2011 | Aguera y Arcas et al. |
| 2011/0252415 | A1 | 10/2011 | Ricci |
| 2011/0261030 | A1 | 10/2011 | Bullock |
| 2011/0276863 | A1 | 11/2011 | Bhise et al. |
| 2012/0047455 | A1 | 2/2012 | Yuan et al. |
| 2012/0066581 | A1* | 3/2012 | Spalink ......................... 715/232 |
| 2012/0077175 | A1 | 3/2012 | Levisay et al. |
| 2012/0096094 | A1 | 4/2012 | So et al. |
| 2012/0151397 | A1 | 6/2012 | Oberstein et al. |
| 2012/0200573 | A1 | 8/2012 | Stoner et al. |
| 2012/0204092 | A1 | 8/2012 | Stoner et al. |
| 2012/0210203 | A1 | 8/2012 | Kandekar et al. |
| 2012/0233539 | A1* | 9/2012 | Reed ............................ 715/234 |
| 2012/0236201 | A1 | 9/2012 | Larsen et al. |
| 2012/0284348 | A1 | 11/2012 | Rothschild |
| 2012/0311509 | A1 | 12/2012 | Maggiotto et al. |
| 2013/0080968 | A1 | 3/2013 | Hanson et al. |
| 2013/0149681 | A1 | 6/2013 | Tinkler et al. |

FOREIGN PATENT DOCUMENTS

| | | |
|---|---|---|
| KR | 10-2005-0108231 A | 11/2005 |
| KR | 10-2010-0020246 A | 2/2010 |
| KR | 10-2011-0001105 A | 1/2011 |
| KR | 10-2011-0046822 A | 5/2011 |
| KR | 10-1051149 B1 | 7/2011 |
| KR | 10-2012-0087248 A | 8/2012 |

OTHER PUBLICATIONS

PCT International Search Report and Written Opinion, PCT Application No. PCT/US2012/023628, Aug. 22, 2012, 9 pages.
PCT International Search Report and Written Opinion, PCT Application No. PCT/US2012/023584, Sep. 25, 2012, 9 pages.
PCT International Search Report and Written Opinion, PCT Application No. PCT/US2012/025438, Sep. 19, 2012, 12 pages.
PCT International Search Report and Written Opinion, PCT Application No. PCT/US2012/025443, Sep. 10, 2012, 11 pages.
PCT International Search Report and Written Opinion, PCT Application No. PCT/US2012/023599, Sep. 10, 2012, 9 pages.
Amazon.com, Inc., "Amazon Kindle User's Guide" $4^{th}$ Edition, 2004-2011, pp. 1-120, can be retrieved at <URL:http://kindle.s3.amazonaws.com/Kindle_User's_Guide_4th_Edition.pdf>.
BBC, "Subtext," BBC-Learning Development, 1 page, [online] [retrieved on Apr. 23, 2012] Retrieved from the internet <URL: http://www.bbcattic.org/learningdevelopment/projects_subtext.shtml>.
BBC, "Bitesize Book Notes-Give You Brain a Boost," BBC-Book Notes, 2012, 1 page, [online] [retrieved on Apr. 23, 2012] Retrieved from the internet <URL:http://www.bbc.co.uk/schools/gcsebitesize/booknotes/>.
Damm, D., et al., "SyncTS: Automatic synchronization of speech and text documents," AES $42^{nd}$ International Conference, Ilmenau, Germany, Jul. 22-24, 2011, pp. 1-10.
Koolen, C., et al., "Electronic Environments for Reading: An Annotated Bibliography of Pertinent Hardware and Software (2011)," 95 Pages.
Landoni, M., "Evaluating E-books," BooksOnline'10, Oct. 26, 2010, pp. 43-46.
Landoni, M., "The Active Reading Task: E-books and their Readers," BooksOnline'08, Oct. 30, 2008, ACM, pp. 33-36.
Lei, D., "Define, translate and search for words in Google eBooks," Google Books Search, Google Inc., May 19, 2011, 3 pages, [online] [retrieved on Apr. 23, 2012] Retrieved from the internet <URL:http://booksearch.blogspot.com/2011/05/define-translate-and-search-for-words.html>.
Mickey, K., et al., "E-Textbooks in Higher Education," Simba Information, 2010, 69 Pages.
Murray, A., "Discover more than 3 million Google eBooks from your choice of booksellers and devices," Google Books Search, Google Inc., Dec. 6, 2010, 2 pages, [online] [retrieved on Apr. 23, 2012] Retrieved from the internet <URL:http://booksearch.blogspot.com/2010/12/discover-more-than-3-million-google.html>.
Neary, L., "Children's Book Apps: A New World of Learning," NPR, Mar. 28, 2011, 3 pages, can be retrieved at <URL:http://www.npr.org/2011/03/28/134663712/childrens-book-apps-a-new-world-of-learning>.

(56) References Cited

OTHER PUBLICATIONS

Socialtext, Inc., "Socialtext 5.0 Features," 2012, 2 pages, [online] [retrieved on Apr. 23, 2012] Retrieved from the internet <URL:http://www.socialtext.com/features/>.

Subtext, "Subtext User Guide," 2011, 44 pages, can be retrieved at <URL:http://www.subtext.com/downloads/Subtext-User-Guide.pdf>.

Ribiére, M., et al., "The sBook: towards Social and Personalized Learning Experiences," BooksOnline'10, Oct. 26, 2010, ACM, 6 pages, can be retrieved at <URL:http://research.microsoft.com/en-us/events/booksonline10/ribiere-etal.pdf>.

Robinson, J., et al., "Using Linked Data to Reduce Learning Latency for e-Book Readers," ESWC 2011 Workshops, LNCS 7117, 2012, pp. 28-34.

Vignoli, F., et al., "A Text-Speech Synchronization Technique with Applications to Talking Heads," ISCA Archive, Auditory-Visual Speech Processing, Aug. 7-10, 1999, 5 Pages.

Webpage for Whatever.com, 2011, 1 page, [online] [retrieved on Aug. 31, 2011] retrieved from the internet <URL: http://www.whatever.com/>.

Wilson, R., et al., "The Web Book experiments in electronic textbook design," Journal of Documentation, 2003, pp. 454-477, vol. 59, No. 4.

ZiiLABS, "Creative Patents Found for "Drag and Drop" on Touchscreen Devices, Revealing Tabbed Web Browsing," Tech in Hiding, Aug. 7, 2009, 6 pages, [online] [retrieved on Jul. 18, 2011] Retrieved from the internet <URL: http://creative.techinhiding.com/2009/08/creative-patents-found-for-drag-and-drop-on-touchscreen-devices-suggesting-multi-tab-web-browsing/>.

Fenwick, J., et al., "Teaching Mobile Computing and Developing Software to Support computer Science Education," SIGCSE,'11, ACM Mar. 9-12, 2011, pp. 589-594.

PCT International Search Report and Written Opinion, PCT/US2012/051643, Mar. 13, 2013, 9 Pages.

Provisional Patent Application filed for U.S. Appl. No. 61/350,965, filed Jun. 3, 2010, 61 Pages.

PCT International Search Report and Written for PCT/US2013/058782, Dec. 17, 2013, 7 Pages.

European Extended Search Report, European Application No. 12842720.0 Mar. 19, 2015, 7 pages

* cited by examiner

EXTENSIBLE FRAMEWORK FOR EREADER TOOLS, INCLUDING NAMED ENTITY INFORMATION

BACKGROUND

1. Technical Field

The subject matter described herein generally relates to the field of electronic books and in particular to a framework for tools for interacting with electronic books.

2. Background Information

Electronic books ("ebooks") come in a variety of formats (e.g., IDPF/EPUB and PDF) and can be read using a variety of devices (e.g., dedicated reading devices and general-purpose mobile devices, tablet computers, laptop computers, and desktop computers). Each device includes reading software ("ereader") that displays an ebook to a user. An ereader that enables a user to interact with an ebook is generally specific to a particular device, a particular ebook format, and/or a particular ebook. Also, the interaction functionality is usually built-in to the ereader. Since ereaders come with limited sets of functionality, software developers want to extend existing functionality and/or add new functionality. However, no framework exists for implementing ereader functionality.

SUMMARY

The above and other problems are addressed by a method, computer-readable storage medium, and computer for providing information about named entities referenced in content of an electronic book ("ebook"). An embodiment of the method includes receiving, from a client device, an ebook identifier identifying the ebook. The method further includes determining, using the ebook identifier, a set of layers available for use with the ebook. The layers in the set provide information associated with the ebook, different layers in the set provide different types of information, and a layer in the set provides information associated with named entities referenced in content of the ebook. The method additionally includes receiving, from the client device, a content range identifying a range of content of the ebook for which layer information is requested and an identification of one or more of the layers in the set for which layer information is requested. The method also includes transmitting, to the client device, layer information associated with the ebook content identified by the content range for the identified layers. The transmitted layer information includes information associated with named entities referenced by ebook content in the content range.

An embodiment of the non-transitory computer-readable storage medium stores executable computer program instructions including instructions for receiving, from a client device, an ebook identifier identifying the ebook. The instructions are further for determining, using the ebook identifier, a set of layers available for use with the ebook. The layers in the set provide information associated with the ebook, different layers in the set provide different types of information, and a layer in the set provides information associated with named entities referenced in content of the ebook. The instructions additionally are for receiving, from the client device, a content range identifying a range of content of the ebook for which layer information is requested and an identification of one or more of the layers in the set for which layer information is requested. The instructions are also for transmitting, to the client device, layer information associated with the ebook content identified by the content range for the identified layers. The transmitted layer information includes information associated with named entities referenced by ebook content in the content range.

An embodiment of the computer includes a non-transitory computer-readable storage medium storing executable computer program instructions comprising instructions for receiving, from a client device, an ebook identifier identifying the ebook. The instructions are further for determining, using the ebook identifier, a set of layers available for use with the ebook. The layers in the set provide information associated with the ebook, different layers in the set provide different types of information, and a layer in the set provides information associated with named entities referenced in content of the ebook. The instructions additionally are for receiving, from the client device, a content range identifying a range of content of the ebook for which layer information is requested and an identification of one or more of the layers in the set for which layer information is requested. The instructions are also for transmitting, to the client device, layer information associated with the ebook content identified by the content range for the identified layers. The transmitted layer information includes information associated with named entities referenced by ebook content in the content range. The computer further includes a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
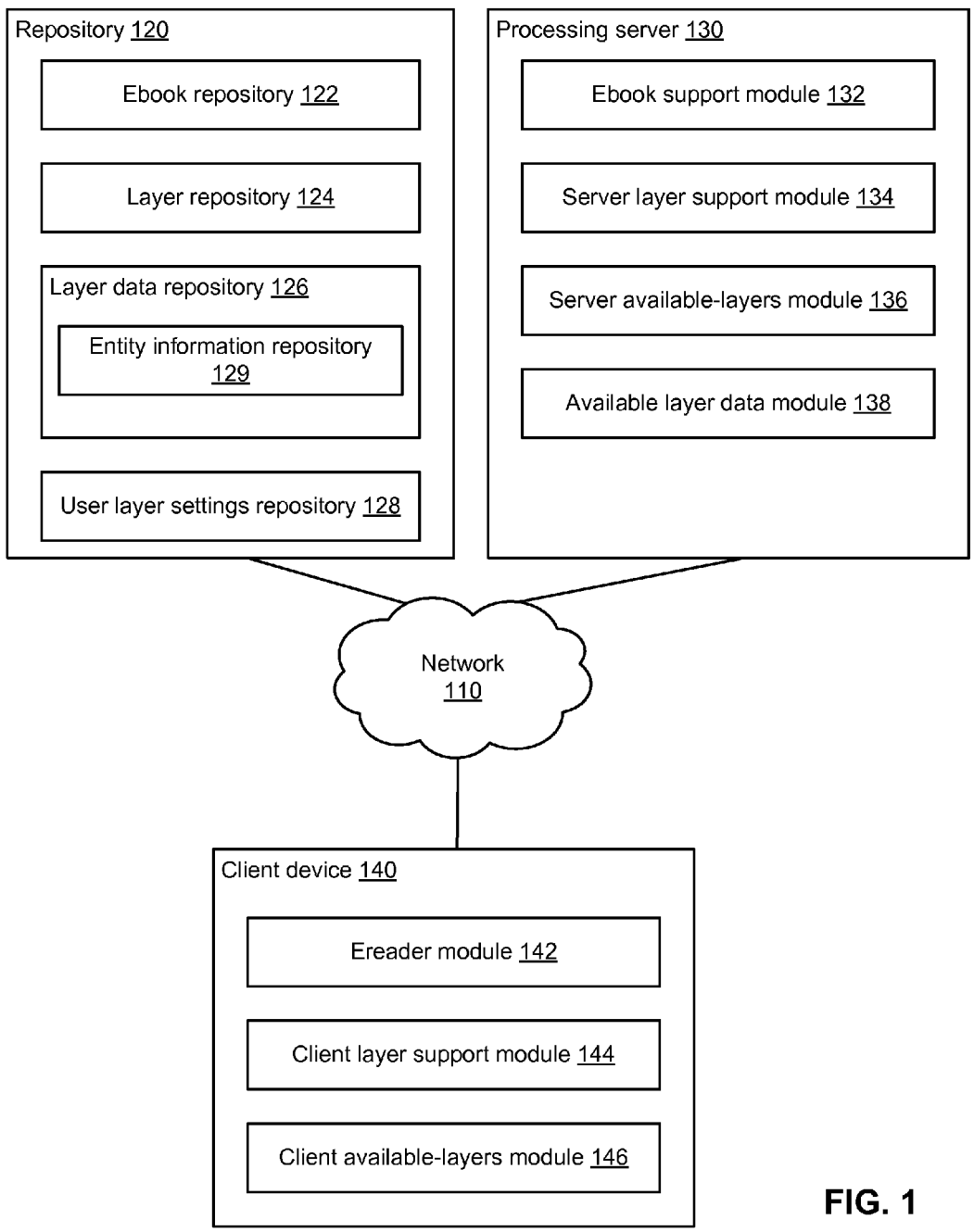
FIG. 1 is a high-level block diagram illustrating an environment for providing a framework for ereader tools according to one embodiment.

FIG. 1 is a high-level block diagram illustrating an environment 100 for providing a framework for tools for use with electronic book reading software ("ereaders") according to one embodiment. The environment 100 may be maintained by an enterprise that enables interaction with electronic books ("ebooks"), such as a corporation, university, or government agency. As shown, the environment 100 includes a network 110, a repository 120, a processing server 130, and a client device 140. While only one of each entity is shown in the embodiment depicted in FIG. 1 for clarity, other embodiments can have multiple repositories 120, processing servers 130, and/or client devices 140.

The network 110 represents the communication pathway between the repository 120, the processing server 130, and the client device 140. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The client device 140 is used by a user to interact with an ebook. The client includes an ereader module 142 that enables the user to view the ebook, a client layer support module 144 that enables an ereader tool ("layer") to be used to interact with the ebook, and a client available-layers module 146 that determines which layers are available to interact with particular ebook content.

The ereader module 142 enables a user to view and/or read an ebook. The ereader module 142 also communicates with the ebook support module 132 to obtain ebooks that are stored in the ebook repository 122. In one embodiment, the ereader module 142 is a JavaScript program that executes on the client device in conjunction with a web browser (also executing on the client device).

The client layer support module 144 enables a layer to be used to interact with an ebook. The client layer support module 144 also communicates with the server layer support module 134 to obtain layer information that is stored in the layer repository 124 and the layer data repository 126.

A layer enhances the functionality of the ereader module 142 by enabling a user to interact with an ebook that is being presented by the ereader module. Specifically, a layer enables a user to interact with particular ebook content. The particular ebook content could be, for example, content that is associated with "layer data" (e.g., content that has been identified as referencing a "named entity" and is associated with "entity information", a type of layer data) or content that the user has activated, where "activated" means indicated in some way, such as by selecting, clicking, tapping, or hovering over. A named entity is a particular object or concept (real or fictional) that is of a particular type, such as a date (e.g., Jul. 4, 1776), a person (e.g., George Washington), or a geographic location (e.g., the Washington Monument in Washington, D.C.). "Entity ebook content" (or, simply, "entity content") is a piece of ebook content that has been identified as referencing a named entity. For example, the text string "Jul. 4, 1776" (entity content) references a date entity of "Jul. 4, 1776"; an image of George Washington (entity content) references a person entity of "George Washington"; and a video of the Washington Monument in Washington, D.C. (entity content) references a geographic location entity of "Washington Monument in Washington, D.C." (Note that a same piece of content can reference different named entities, depending on the context surrounding the content. For example, the string "Paris" can reference a geographic location entity of "Paris, France" or a person entity of "Paris of Troy".) In this way, a layer adds contextually useful interactivity to the ebook. The particular ebook content may be text, an image, and/or other embedded content. In one embodiment, multiple types of content can be interacted with simultaneously. A layer is able to display information associated with the ebook, such as information from the ebook, information from layer data, and/or information generated based on ebook information and/or layer data information. A layer is able to store data and associate it with particular ebook content. The data is referred to as an "annotation", and the ebook content with which the data is associated is referred to as "annotated content." An existing annotation can be obtained from the layer data repository 126, and a new annotation can be created by a layer (e.g., due to user interaction with the layer). A layer includes executable code and metadata. Layer executable code is a computer program module ("layer module") that executes on the client device 140.

Layers can provide various types of functionality for interacting with ebook content. Layers can be created by anyone, such as third parties and/or book publishers. Some layers apply to ebook content in general. Exemplary layers of this type include Margin Notes, Define, Translate, Search Book, Search Internet, and Search Encyclopedia.

Margin Notes—The Margin Notes layer enables a user to highlight and/or add a note to content in an ebook. The user activates content in the ebook and then uses the Margin Notes layer to highlight the activated content (in any of a variety of colors) and/or enter information (a "note") to associate with the activated content. The user specifies a desired highlight color by selecting a displayed color (e.g., yellow, green, pink, or blue) or using a default color (e.g., yellow). The note information can include, for example, typed characters, a URL, handwritten information, or multimedia (e.g., a still image, a video, or audio). If particular ebook content is already associated with a note, then activating that content will cause the note to be displayed. The displayed note can then be edited or deleted if desired. The highlight color and the note information are examples of information stored in an annotation.

Define—The Define layer enables a user to view a definition associated with content in an ebook. The user activates content in the ebook and then uses the Define layer to display a definition of the activated content. For example, a popup window appears with a definition of a word appearing in the activated content.

Translate—The Translate layer enables a user to view the translation of content in an ebook. The user activates content in the ebook and then uses the Translate layer to display a translation of the activated content. The Translate layer may automatically determine the language of the activated content and display the translation of the content in a user-selected language using a popup window or other user interface element. In one embodiment, the Translate layer uses the Google Translate translation service.

Search Book—The Search Book layer enables a user to search an ebook for specified content within that ebook. The user activates content in the ebook and then uses the Search Book layer to search for other instances of the activated content in that same ebook. The Search Book layer displays the search results (e.g., a list of citations to the matching content instances).

Search Internet—The Search Internet layer enables a user to search the Internet for content in an ebook. The user activates content in the ebook and then uses the Search Internet layer to search the Internet for the activated content. The Search Internet layer displays the search results (e.g., a list of web sites matching the activated content).

Search Encyclopedia—The Search Encyclopedia layer enables a user to search an electronic encyclopedia for content in an ebook. The user activates content in the ebook and then uses the Search Encyclopedia layer to search the encyclopedia for instances of the activated content. The Search Encyclopedia layer displays the search results (e.g., a relevant encyclopedia article).

Some layers apply to ebook content that has been identified as referencing one or more named entities. These layers are referred to as "named entity layers." Each of these named entities is associated with "entity information" (a type of layer data). Entity information includes "generic" entity data (a type of data common to entities of all types), "special" entity data (a type of data specific to entities of a particular type), and an entity instance (a description of a piece of ebook content identified as referencing a named entity). In one embodiment, in addition to entity information that concerns one piece of entity content (and its referenced named entity), entity summary data is also available. Entity summary data, a type of layer data, includes an overview of multiple named entities that are referenced in one ebook. In one embodiment, for each type of named entity that is referenced in an ebook (e.g., generic entity, date entity, person entity, or geographic location entity), entity summary data is available at the ebook-level and at the chapter-level. Exemplary layers of this type include layers that apply to entities of all types and layers that apply to only certain types of entities (e.g., date entities, person entities, and geographic location entities). Entity summary data may also be displayed in connection with other named entity layers.

Layers that apply to entities of all types—A layer that applies to entities of all types presents information based on generic entity data and/or entity instances. The user activates content in the ebook (which has been identified as referencing a named entity) and then uses the generic-entity layer to display generic entity data and/or entity instances (or information based on same) from the entity information associated with the named entity referenced by the activated content. For example, assume that the generic entity data includes a description, an overview image, a main URL, related links, and/or related multimedia. Regarding the overview image and the related multimedia, the generic entity data can include a copy of the image/multimedia content, a URL that points to the image/multimedia content, and/or a unique identifier (ID) of the image/multimedia content. Providing the unique ID to a content server acts to request the relevant image/multimedia content. In one embodiment, multiple unique IDs can be provided to the content server together (instead of one ID at a time), such that multiple pieces of content will be sent by the content server together (instead of one piece of content at a time). While named entities of all types include this generic entity data, the exact information stored as the generic entity data (e.g., the particular overview image or the particular related links) can differ depending on the type of the named entity.

Regarding generic entity information, one generic-entity layer displays all of a named entity's generic entity data in one location (e.g., in one popup window or in a sidebar displayed by the ereader). Another generic-entity layer displays only part of a named entity's generic entity data (e.g., only the named entity's description, or only the named entity's related links and related multimedia, or only the named entity's overview image that, when clicked, navigates a web browser to the named entity's main URL). Regarding generic entity summary data, one generic-entity layer displays various page numbers (on which the named entity is referenced) that, when clicked, navigate the ebook to those pages.

Layers that apply to date entities—A layer that applies to entities of the "date" type presents information based on special entity data specific to date entities. The user activates content in the ebook (which has been identified as referencing a date entity) and then uses the date-entity layer to display special entity data (or information based on special entity data) from the entity information associated with the date entity. For example, for a date entity, the special entity data portion of the entity information includes a year, a month, and a day.

Regarding date entity information, one date-entity layer displays an encyclopedia article concerning an event that occurred on that date. Another date-entity layer displays a calendar showing that date in the context of its surrounding month. Yet another date-entity layer displays information regarding "this date in history" (e.g., events that occurred on the same month and day as the date entity but a different year).

Regarding date entity summary data, one date-entity layer displays a list of dates referenced in the ebook, possibly aggregated into time periods (e.g., decades or centuries) and/or shown as a timeline. Activating a date displays more information about the date, such as: chapters/pages where the date is referenced (and the ability to navigate to them), events that are related to the date (in real life or in the ebook), characters or locations that are referenced nearby the date or are related to it, other books/movies/music related to the same location/character and date (and the ability to purchase them), information about books/music/movies related to the date or time period within which the date occurs (and the ability to purchase them), and summary information for related entities.

Layers that apply to person entities—A layer that applies to entities of the "person" type presents information based on special entity data specific to person entities. Note that a person entity can represent a real person (e.g., George Washington) or a fictional character (e.g., Dr. Henry Jekyll in the "Strange Case of Dr. Jekyll and Mr. Hyde" novella by Robert Louis Stevenson or Snoopy in the "Peanuts" comic strip by Charles Schultz). The user activates content in the ebook (which has been identified as referencing a person entity) and then uses the person-entity layer to display special entity data (or information based on special entity data) from the entity information associated with the person entity. For example, for a person entity, the special entity data portion of the entity information includes biographical information about the person.

Regarding person entity information, one person-entity layer displays people the person interacts with at the location in the ebook of the activated content. Another person-entity layer describes other people that the person is related to at the location in the ebook of the activated content, omitting people that are mentioned in only previous or subsequent locations. Other person-entity layers may display information including a place on a map where the person is currently located, a place in a timeline of character development for the person corresponding to the location of the activated content, a summary of information about the character relative to the entire ebook, and a summary of information about the content relative to information in the specific chapter or other section in which the content is activated.

Regarding person entity summary data, one person-entity layer displays a list of people/characters referenced in the ebook, possibly shown as a family tree or relationship graph. Activating a character displays more information about the character, such as: chapters/pages where the character is referenced (and the ability to navigate to them; includes where the character is introduced and where the character is last mentioned), timeline of development of the character (birth, significant life events, death), dates/geographic locations where the character is referenced, other characters that are referenced nearby the character or are related to the character, a map of how the character travels to different geographic locations, a graph of how the character is related to other characters (e.g., a family tree or relationship graph), other books/movies/music the character appears in (and the ability to purchase them), information about books/music/movies related to the character (and the ability to purchase them), information about books/music/movies written by the same author and/or in the same series (and the ability to purchase them), and summary information for related entities.

Layers that apply to geographic location entities—A layer that applies to entities of the "geographic location" type presents information based on special entity data specific to geographic location entities. Note that a geographic location entity can represent a real location (e.g., Washington, D.C.) or a fictional location (e.g., Middle Earth in the "Lord of the Rings" trilogy by J. R. R. Tolkien or the Galactic Empire in the "Foundation" trilogy by Isaac Asimov). The user activates content in the ebook (which has been identified as referencing a geographic location entity) and then uses the geo-entity layer to display special entity data (or information based on special entity data) from the entity information associated with the geographic location entity. For example, for a geographic location entity, the special entity data portion of the entity information includes a latitude coordinate, a longitude coordinate, an altitude, a type of geographic feature (e.g., building, mountain, or lake), and a default view mode (e.g., a street map, a satellite view, or a street view).

Regarding geo-entity information, one geo-entity layer displays a map that includes a pin indicating the geographic location. The map can be, for example, a static image or an interactive map with various view modes that enables a user to pan/zoom the map. Another geo-entity layer displays travel resources related to the geographic location, such as links to hotels, restaurants, points of interest, flights, travel books or articles, etc. (assuming the geographic location is real). Yet another geo-entity layer displays directions from the client device's location to the geographic location (assuming the client device is aware of its location and the geographic location is real). Yet another geo-entity layer displays a satellite view that "flies" from the client device's location to the geographic location (assuming the client device 140 is aware of its location and the geographic location is real).

Regarding geo-entity summary data, one geo-entity layer displays a list of geographic locations referenced in the ebook, possibly shown as a map with pins indicating the various locations. Activating a geographic location displays more information about the geographic location, such as: chapters/pages where the location is referenced (and the ability to navigate to them), characters/dates that are referenced nearby the location, other locations that are referenced nearby the location, other books/movies/music that take place in that location (and the ability to purchase them), information about books/music/movies related to the location (and the ability to purchase them), and summary information for related entities.

In one embodiment, more than one layer can be used at the same time and/or multiple instances of the same layer can be used at the same time (e.g., for different activated or annotated ebook content). Also, multiple layers can display information simultaneously. In another embodiment, layers cannot interact with each other. While multiple layers can be used simultaneously (possibly for the same activated or annotated content), the layers cannot access each other's data.

In one embodiment, the client layer support module 144 includes functionality related to enabling/disabling layers, launching layers, indicating the presence of layer data, and providing an application programming interface (API) to layers. Regarding enabling/disabling layers, the client layer support module 144 enables a user to enable/disable layers. Enabled layers can be provided as options in a layer popup menu, while disabled layers cannot. Also, layer data (e.g., annotations, entity information, or entity summary data) associated with enabled layers can be displayed automatically. In one embodiment, a user can designate an enabled layer as "automatic-launch," which causes the layer to be launched when the ereader module 142 displays ebook content associated with relevant layer data. In one embodiment, a graphical user interface lists "installed" layers (indicated by the user layer settings repository 128), and the user enables/disables these layers (and possibly marks them as "automatic-launch") by checking/unchecking various boxes. These settings are then stored and made available by the client layer support module 144.

Regarding launching layers, the client layer support module 144 launches a layer (i.e., creates an instance of a layer) so that a layer module is executed by the client device. An instance of a layer (e.g., content dynamically rendered by a layer) is displayed within the ereader module's main window or displayed by a separate application (e.g., a web browser invoked with a URL or a map application invoked with an address). In one embodiment, a layer can be displayed in various modes, such as overlay (floating above an entire page of ebook content), replace (floating above particular ebook content, thereby "hiding" the ebook content), side panel (present in a side panel adjacent to the ebook content, possibly in the form of a small preview that can be interacted with), and margin (present in a margin area of the ebook content, possibly in the form of a very limited preview). The ereader module 142 allocates a display area inside of which a layer can create user interface (UI) controls. The ereader module 142 instructs the layer to render itself into the appropriate display area and informs the layer of the context in which it is rendering itself (e.g., overlay, replace, side panel, or margin). The display area that is allocated depends on the layer's display mode. In one embodiment, a layer cannot modify the size of its display area, move the display area, or create UI elements outside of the display area. In another embodiment, a layer can request the properties of its display environment (e.g., display mode, display area size, display area location, and pinning status) and/or be notified of any changes.

In one embodiment, when the client layer support module 144 launches a layer, the client layer support module 144 also sends layer usage data to the server layer support module 134. The server layer support module 134 then stores the layer usage data. In one embodiment, layer usage data includes a layer ID of the layer that was launched, a display mode in which the layer was launched, a user ID, an ebook ID, an associated (e.g., activated or annotated) content range, a type of the content range, ebook context, web browser information, and/or client device information. The type of the content range can be a data type (e.g., text, image, video, or audio), an annotation type (e.g., the layer that created the annotation), or an entity type (e.g., date, person, or geographic location). In one embodiment, the client layer support module 144 notifies a user of the types of information that are collected and transmitted to the server layer support module 134 and provides the user the opportunity to opt-out of having such information collected and/or shared with the server layer support module 134.

The client layer support module 144 provides two ways to launch a layer: manually and automatically. Manual launch of a layer involves a popup menu that enables a user to launch a layer. Responsive to a user activating ebook content (presented by the ereader module 142), the client layer support module 144 uses the client available-layers module 146 to determine which layers are available for interacting with the activated content. If only one layer is available, then an instance of that layer is launched with respect to the activated content using a particular display mode. If multiple layers are available, then the client layer support module 144 displays a user interface listing the available layers. In one embodiment, the available layers are listed in the popup menu according to a sort order. One example of a sort order is alphabetical order. Another example of a sort order is popularity (e.g., popularity of using a particular layer (layer ID) to interact with a particular ebook (ebook ID) or with a particular content range within a particular ebook). Popularity is determined based on, for example, the layer usage data stored by the server layer support module 134. The client layer support module 144 obtains layer usage data from the server layer support module 134 and uses the data to sort the available layers according to their popularity. Responsive to the user activating a layer entry, an instance of that layer is launched with respect to the activated content using a particular display mode.

Automatic launch of a layer involves layer data (e.g., entity information) associated with ebook content. Responsive to ebook content being displayed by the ereader module 142, the client layer support module 144 determines whether any layer data is associated with the ebook content. If layer data is associated with the ebook content (i.e., if the ebook content is "annotated"), then the client layer support module 144 determines whether that layer data indicates that a layer should be automatically launched. In one embodiment, there are two ways in which layer data can indicate that a layer should be automatically launched. One way is that the layer indicated by the layer data has been designated by the user as "automatic-launch" (part of enabling/disabling layers). Another way is that a) the annotated content style indicated by the layer data (e.g., the Style data item in Table 1 or Table 2) specifies that the layer indicated by the layer data should be automatically launched and b) the layer indicated by the layer data has been enabled by the user. For layer data that is entity information, the "layer indicated by the layer data" is, for example, the first layer that would appear on a popup menu were a user to activate the relevant ebook content. For layer data that is an annotation, the "layer indicated by the layer data" is, for example, the layer associated with the Layer ID data item in Table 1. The client layer support module 144 then automatically launches the layer with respect to the layer data using a particular display mode. Note that automatic layer launch causes layer content (e.g., annotations, entity information, or data provided by layers) to be displayed, even if the associated ebook content has not been activated by the user.

Note that the module of the layer must exist on the client device 140 before the layer instance can be launched. In one embodiment, the layer module is transferred from the repository 120 to the client device 140 (via the processing server 130 and the network 110) when the list of available layers is received in step 430 of FIG. 4. For example, the modules of all available layers are transferred or the modules of only the "installed" available layers (as indicated in the user layer settings repository 128) are transferred. In another embodiment, the layer module is transferred when an attempt is made to launch the layer, either manually (e.g., using a popup menu) or automatically (e.g., based on layer data). For example, the client layer support module 144 detects the attempt and, in response, sends a request to the server layer support module 134 (via the network 110) for the relevant layer module. The server layer support module 134 receives the request and, in response, sends the relevant layer module to the client layer support module 144 (via the network 110). In yet another embodiment, the layer module is transferred at any other suitable time (e.g., when the ereader module 142 is initially installed on the client device 140).

Note that the layer module can already be present on the client device 140 due to having been transferred in the past. In one embodiment, a layer module on the client device is deleted after the ereader module 142 ceases executing. In another embodiment, a layer module on the client device remains on the client device even after the ereader module ceases executing. If a layer module remains, the module can be updated later on as necessary (e.g., as indicated by a module version number).

Regarding indicating the presence of layer data (e.g., annotations or entity information), the client layer support module 144 can visually indicate ebook content (presented by the ereader module 142) that is associated with layer data. For example, the client layer support module 144 highlights or otherwise styles the ebook content that is associated with the layer data (referred to as "annotated content"). In one embodiment, the client layer support module 144 visually indicates only annotated content that is associated with an annotation whose associated layer is enabled and only entity content that is of a type where a relevant entity layer is enabled (e.g., a date-entity layer or a generic-entity layer). In this embodiment, the client layer support module 144 does not visually indicate annotated content that is associated with an annotation whose associated layer is disabled, nor does it indicate entity content that is of a type where all relevant entity layers are disabled.

In one embodiment, the display style of annotated content ("annotated content style") is configurable from a fixed set of options. Options include, for example, simple formatting, display mode, and automatic layer launch. Simple formatting includes, for example, text style options (e.g., font, color, highlighting, italics, boldface, underlining, and outlining) and indicators (e.g., mini-icons or chiclets) that are displayed in the ebook margins or alongside ebook content to indicate that a particular type of layer has content available near that location. In one embodiment, annotated content (e.g., entity content) is indicated in the page slider presented by the ereader module 142. This makes it easy for the user to return to a page with annotated content. Display mode includes a default or preferred display mode in which to launch a particular layer (e.g., the layer associated with the annotation or a layer relevant to the entity type) (e.g., overlay, replace, side panel, or margin). Automatic layer launch specifies that a particular layer (e.g., the layer associated with the annotation that is associated with the annotated content or a layer relevant to the entity type) should be automatically launched when the annotated content is displayed by the ereader module 142. Note that simple formatting, display mode, and automatic layer launch can be used independently of each other.

For example, if automatic layer launch is used without simple formatting, then the annotated content does not appear differently from non-annotated content; however, a layer is automatically launched when the annotated content is displayed.

Display styles can be set on a case-by-case basis, so different instances of ebook content associated with annotations saved by the same layer can be displayed differently (e.g., yellow highlighting versus green highlighting for different passages annotated by the same Margin Notes layer). Also, entity content that references a first named entity can be displayed differently from entity content that references a second named entity, whether or not the first named entity and second named entity are of the same entity type. Note that when an existing annotation is saved, the annotated content style of the layer data can be modified. For example, consider an Inscription Layer that enables an inscription to be added to an ebook. The annotated content style of Inscription Layer layer data specifies that the annotated content does not appear differently from non-annotated content. However, when the annotated content is displayed, the Inscription Layer is automatically launched in overlay mode (floating above the entire page of ebook content that contains the annotated content), and the inscription (as specified in the annotation portion of the Inscription Layer layer data) is displayed. The user views the inscription and closes the Inscription Layer. Responsive to the Inscription Layer being closed, the annotated content style of the Inscription Layer layer data is updated. The updated style specifies that the next time the annotated content is displayed, the Inscription Layer is not automatically launched. Instead, an icon is displayed in the margin and can be used to access the inscription stored in the annotation portion of the Inscription Layer layer data.

Note that layer data must exist on the client device 140 before the layer data can be displayed. In one embodiment, layer data is transferred from the repository 120 to the client device 140 (via the processing server 130 and the network 110) in response to a request from the client layer support module 144 (see steps 440 and 460 in FIG. 4).

In one embodiment, a layer cannot draw its own style for annotated content. In this embodiment, the client layer support module 144 indicates annotated content using a configurable style (e.g., chosen by the user). In one embodiment, layer data can specify its own style for annotated content. For example, the annotated content style is indicated by the Style data item (see Table 1 further discussed herein). In one embodiment, entity information can specify its own style for entity content. For example, the entity content style is indicated by the Style data item (see Table 2 further discussed herein).

In one embodiment, a "layers side panel" view for an ebook includes one area that displays ebook content and another area (a "layers side panel") that displays layer content (e.g., annotations, entity information, or entity summary data). The layers side panel area is adjacent to the ebook content area and can differ in size relative to the ebook content area. When an ebook is displayed in side panel view, layers are automatically launched in side panel display mode when relevant annotated content is displayed in the ebook content area (regardless of the annotated content style or the entity content style specified in the layer data and regardless of whether the layers have been designated as "automatic-launch"). In another embodiment, a "layers display" view for an ebook shows all of the layer content (e.g., annotations, entity information, or entity summary data) associated with the ebook in a single view, organized by category, by prominence, or in another way. For example, the layers display view displays annotations, entity information, or entity summary data on a page-by-page basis, corresponding to the pages of the ebook (whether or not the ebook content is also displayed).

A layer uses an API provided by the client layer support module 144 (referred to as the "Layer API"). In one embodiment, the client layer support module 144 provides a JavaScript API. The Layer API includes various functions. Exemplary functions are described below:

(i) A function to obtain the ebook content for which the layer was invoked (referred to as "content range"). For example, the function calls a piece of executable code (a "callback") with an object describing the content range. The content range may include content of various types (e.g., text content, audio content, image content, and video content). The content range may include multiple annotated content segments. These annotated segments are represented as individual ranges within the entire content range. The content range object provides methods to access these ranges.

(ii) A function to save an annotation and an annotated content style and associate them with a content range, replacing any previously saved annotation and annotated content style.

(iii) A function to load layer data (e.g., an annotation, entity information, or entity summary data) associated with a content range. Regarding entity summary data, a function to query for named entities related to the content range (which references a named entity). For example, the function can be used to answer the question "What geographic location entities in the ebook are referenced close to the content range (which references a geographic location entity)?" A layer can then display related entities at the same time as other entity instance information. For example, a layer can display related geographic locations on the same map as the geographic location referenced by the content range.

(iv) A function to access ebook-level and chapter-level entity summary data.

(v) A function to navigate an ebook (i.e., control which portion of the ebook is displayed by the ereader module 142). In one embodiment, this function includes the ability to navigate backwards one page, navigate forwards one page, go to a specific chapter, go to a specific page, go to a specific position within a page, and go to a specific piece of content (e.g., an image, table, or figure).

(vi) A function to search inside an ebook (e.g., using functionality from the ereader module 142). A search panel is displayed, and search results are highlighted. The layer remains visible.

(vii) A function to close the layer instance so that the layer is no longer displayed.

A layer can access the ebook content for which it was launched (e.g., activated content or annotated content) and also a context object. A context object is a data structure that stores information about a particular ebook's context. In one embodiment, the context object includes only context that is local to the ebook and the user's interaction with the ebook. Local context includes, for example, ebook title, author, publisher, indication of currently-displayed portion of ebook (e.g., chapter number and page number), indication of current ebook display mode (e.g., flowing text versus scanned image), and device capabilities. In another embodiment, additional context is provided such as related books, most popular pages in the ebook, etc. The additional context can be provided in the same context object or through additional Layer API functions.

In one embodiment, the Layer API enables a layer to specify an annotated content style (including an entity content style). In another embodiment, a generic UI control is provided by the ereader module 142 so that the user can specify the annotated content style. In this UI, the user can specify "use this display style for the current annotated content only" or "use this display style for all content [annotated by/of an entity type relevant to] this layer." In yet another embodiment, a layer can indicate whether a generic UI control should be displayed to specify annotated content style or whether the layer will provide its own UI controls to specify annotated content style.

The client available-layers module 146 determines which layers are available to interact with activated ebook content. Specifically, the client available-layers module 146 takes as input a list of available layers (output by the server available-layers module 136), activated content, and a list of enabled layers and outputs a list of layers that are available for interacting with the activated content. The client available-layers module 146 compares the list of available layers to the list of enabled layers to determine a list of possible layers (i.e., layers that are both available and enabled). The type of the activated content is then compared to the possible layers (specifically, to the layers' metadata, which specifies what type of ebook content can be interacted with using each layer). The type of the activated content can be a data type (e.g., text, image, video, or audio), an annotation type (e.g., the layer that created the annotation), or an entity type (e.g., date, person, or geographic location). The client available-layers module 146 outputs the matching layers as a list. Note that this list of layers is activated-content-specific.

The repository 120 is a computer (or set of computers) that stores an electronic book ("ebook") repository 122, an ereader tool ("layer") repository 124, a layer data repository 126, and a user layer settings repository 128. In one embodiment, the repository 120 includes a server that provides the processing server 130 access to the ebook repository 122, layer repository 124, layer data repository 126, and user layer settings repository 128 in response to requests.

The ebook repository 122 stores various ebooks. In one embodiment, an ebook adheres to the JavaScript Object Notation (JSON) format. An ebook includes content and metadata. Ebook content includes an electronic collection of text (and possibly additional types of content such as images and/or sound). For example, ebook content includes content of a book such as would be printed on the pages of a traditional paper-based book. All of the text in the collection may be from a single source, or the collection may contain text from different sources. The text may have originated in a traditional paper-based format (e.g., a physical book or newspaper), or it may have originated in a digital format (e.g., electronic files in a format such as Portable Document Format (PDF), EPUB format, or flowing text format). The content of an ebook is divided into segments so that portions of the content can be transferred and/or loaded separately. For example, an ebook can include one segment for each chapter. In one embodiment, ebook content includes files that adhere to the HTML format, the Cascading Stylesheets (CSS) format, and various multimedia formats (e.g., audio files, image files, and video files).

Ebook metadata includes bibliographical information about an ebook, such as the title, author, publication date, number of pages, number of chapters, etc. Ebook metadata also includes a list of segments into which the ebook's content is divided. A segment is represented on the list by, for example, a unique identifier. In one embodiment, ebook metadata also includes a blacklist, a whitelist, and/or an add-list. These lists control which layers can be used with an ebook. A blacklist specifies layers that cannot (i.e., are not allowed to) be used with a particular ebook. A whitelist specifies layers that can (i.e., are allowed to) be used with a particular ebook. An add-list specifies layers that are recommended to be used with a particular book. For example, an ebook publisher can require that a particular ebook be interacted with in accordance with a particular blacklist, whitelist, and/or add-list. A layer is represented on a list by, for example, a unique identifier.

The layer repository 124 stores various layers. A layer includes executable code and metadata. Layer executable code is a computer program module ("layer module") that executes on a client device 140 and enhances the functionality of an ereader module 142. A layer enables a user to interact with an ebook that is being presented by the ereader module. Specifically, a layer enables a user to interact with particular ebook content (e.g., content that the user has activated or content that is associated with layer data). The particular content may be text, an image, or other embedded content. In one embodiment, multiple types of content can be activated simultaneously. In one embodiment, a layer module is implemented as a JavaScript program.

Layer metadata specifies what type of ebook content a particular layer is applicable to (i.e., what type of content can be interacted with using a particular layer). The type of the ebook content can be a data type (e.g., text, image, video, or audio), an annotation type (e.g., the layer that created the annotation), or an entity type (e.g., date, person, or geographic location). For example, a first layer can enable interaction with only textual content, while a second layer can enable interaction with only graphical content. As another example, a first layer can enable interaction with only geographic location entity content, while a second layer can enable interaction with all types of entity content. Layer metadata also specifies which display modes (e.g., overlay, replace, side panel, and/or margin) are supported by the layer, possibly designating one of the supported display modes as the default or preferred display mode.

Regarding how a layer is implemented, and how client-side code can execute a layer, in one embodiment, an extensible framework for layers includes the following features: 1) An XML file format for packaging a layer's HTML, JavaScript, and application descriptor into a single file. The application descriptor indicates which types of ebook content the layer is applicable to. 2) A service that renders a layer XML file into HTML/JavaScript that can be displayed in a web browser. 3) Client-side JavaScript for existing web applications (e.g., ereader module 142 and/or client layer support module 144) to instantiate layers and display them inside a container element. The JavaScript creates sandboxed iframe HTML elements for each layer. The iframes use uniform resource locators (URLs) that point back to the service to render the requested layer. 4) Client-side JavaScript for a remote procedure call (RPC) framework that enables applications (e.g., ereader module 142 and/or client layer support module 144) to register JavaScript methods (the Layer API) that the layers can call from their sandboxed iframes. This enables layers to call back into the application and send/receive data. Also, executing a layer in an isolated iframe prevents the layer from interfering with the operation of the ereader module 142. 5) The ability to bundle RPC methods into a user interface extension (UIX) "feature." A Books feature exposes books-specific APIs (the Layer API) to the layers via the RPC framework. A layer can indicate in its application descriptor which features it requires to execute.

The layer data repository 126 includes information concerning data that is used by a layer (e.g., to display to the user when the layer is launched). In one embodiment, the data was created by a layer during execution of the layer (e.g., due to user interaction with the layer). In another embodiment, the data was created before the layer was ever executed. (For example, the creator of a layer that is meant to display study guide text would also create layer data with the actual study guide text. This layer data would exist before the study guide layer was ever executed and would be available to users of the study guide layer.) Layer data is associated with particular ebook content. Recall that a layer enables a user to interact with particular ebook content (e.g., content that the user has activated or content that is associated with layer data). Data that is stored by a layer (e.g., a "note" added by a user with the Margin Notes layer) is associated with the particular ebook content that was activated or annotated when the layer was launched. If, at a later time, the same layer is launched with respect to the same ebook content, then the layer will load its previously stored data. This data is known as an annotation.

In one embodiment, data stored by a layer is accessible to only that layer and is not accessible to other layers. In another embodiment, data stored by a layer when a particular user account is active is accessible to only that user account and is not accessible to other user accounts. In yet another embodiment, data can be stored by a layer only when a user account is active (i.e., when a user has logged in) and cannot be stored when the user is anonymous.

In one embodiment, layer data includes three elements: a range of ebook content (the particular ebook content with which the layer data is associated; "annotated content"), a location of the content range, a type (e.g., an indication of the particular layer that created the layer data), and an annotation (the data that a layer stores and retrieves for user interaction purposes; e.g., a "note" added by a user with the Margin Notes layer). The content range includes any type of ebook content, such as text and/or multimedia (e.g., audio, still images, and/or video). The location of the content range includes, for example, an ebook indicator (e.g., a volume ID), a page indicator (e.g., a page ID), and a position range that includes a start position and an end position. Each position is an internal marker for a position within an ebook and includes, e.g., a paragraph indicator and an offset within that paragraph. In a graphic novel where there is no text, a position can be specified for each image. The image positions can be used to determine where a content range starts and/or ends so that images within the content range can be indicated. In one embodiment, multiple position types are supported (e.g., text, image, canonical fragment indicators (CFI), EPUB markers, and/or arrays of bounding boxes). The indication of the particular layer that created the layer data is, for example, a layer identifier ("ID"). In one embodiment, each instance of layer data is associated with only one layer (i.e., the layer that created the layer data instance).

An ebook can be updated frequently, resulting in different versions with different content locations. Content locations between these different versions should be translated so that layer data can be associated with the correct ebook content. In one embodiment, a position validation service performs this translation.

For example, assume that a client device 140 requests layer data for a particular page of an ebook cached at the client. The indexed (i.e., currently live) ebook in the ebook repository 122 is of a different version than the version at the client, so the pagination might be different. In this situation, after the server layer support module 134 receives the client's request for layer data (which includes an indication of the particular page), the server layer support module 134 uses the position validation service to translate the content locations for that page. Specifically, the position validation service translates the content locations for the page specified by the client (which is associated with the client's version of the ebook) to the content locations for a (possibly different) page that is associated with the indexed version of the ebook. Layer data for the content locations associated with the indexed ebook is then obtained from the layer data repository 126. The position validation service is then used again to translate the content locations for the obtained layer data from the indexed ebook to the client's ebook. The layer data with the modified locations is then sent to the client.

As another example, assume that a client device 140 saves layer data associated with particular content ("annotated content") in an ebook cached at the client. The indexed (i.e., currently live) ebook in the ebook repository 122 is of a different version than the version at the client, so the pagination might be different. In this situation, after the server layer support module 134 receives the client's layer data (which includes an indication of the annotated content location), the server layer support module 134 uses the position validation service to translate the annotated content location. Specifically, the position validation service translates the location for the annotated content specified by the client (which is associated with the client's version of the ebook) to the annotated content location that is associated with the indexed version of the ebook. The client's layer data with the modified location is then saved in the layer data repository 126.

The position validation service keeps track of layer data positions within ebooks (specifically, positions of ebook content associated with layer data). Position information includes, for example, page information and original scanjob information (e.g., information regarding the scanning of the underlying book to create the ebook). Page information includes, for example, a volume (ebook) page ID and a volume structured page ID. Scanjob information includes, for example, a scanjob ID and a scanjob page ID. Position information can also include a volume ID, the content before the annotated content, the annotated content itself, and the content after the annotated content. In one embodiment, position information is used to localize a layer data position within an old version of an ebook within a new version of the same ebook. Text alignment is then performed (using, for example, the Associated Ebook Text item in Table 1) to calculate an exact position.

Table 1 shows data items that are stored for each instance of layer data according to one embodiment.

TABLE 1

| Data Item Name | Data Item Description |
| --- | --- |
| Volume ID | the volume (ebook) the layer data is for |
| Layer ID | the layer the layer data is for |
| User ID | the user ID of the owner |
| ACL | the permissions for the layer data |
| Page ID | the multiple page IDs the layer data can span |
| Before Text | the text before the associated (activated or annotated) ebook content (if any) |
| After Text | the text after the associated (activated or annotated) ebook content (if any) |
| Associated Ebook Text | the text portion (if any) of the associated (activated or annotated) ebook content |
| Style | the style information for associated (activated or annotated) ebook content (e.g., simple formatting and/or automatic layer launch; "annotated content style") |
| Data | the data to store for the layer (for user interaction purposes; "annotation") |
| Client Sent Range Association | start/end position and start/end offset for multiple position types (text, image, canonical fragment indicators (CFI), EPUB marker); the range information, including content version, of where the associated (activated or annotated) content is exactly |

TABLE 1-continued

| Data Item Name | Data Item Description |
| --- | --- |
| | located for the specified version of the volume when this layer data was last created or modified as sent by the client |
| Current Range Association | same as Client Sent Range Association but for current volume version; the current range information, including the current content version, of where the associated (activated or annotated) content is exactly located for the specified version of the volume when this layer data was last created or modified |
| Current Volume Version | current version of the volume |
| Scanjob Information | helpful when moving the layer data because of content shifting (e.g., between volume versions) |
| Last Modified | timestamp of last modification for this layer data |
| Created | timestamp of when layer data was created |

In one embodiment, the Style data item in Table 1 is implemented as a dictionary object of name/value pairs for the different style attributes. The dictionary object is represented as a JSON object in JavaScript. In one embodiment, layer data can be queried by using the following parameters: a) user, b) user and volume (and possibly also page id(s)), and c) user, volume, and layer id (and possibly also page id(s)).

The layer data repository 126 also includes an entity information repository 129. The entity information repository 129 includes information concerning various named entities referenced in various ebooks (e.g., the ebooks stored within the ebook repository 122, identified by a volume ID). Recall that particular ebook content can be identified as referencing a named entity. Different pieces of content within the same ebook can be identified as referencing the same named entity. For example, the text string "George Washington" and an image of George Washington, both within the same ebook, can be identified as referencing the same named entity (i.e., a person entity representing the real person George Washington).

In one embodiment, entity information for a particular named entity within a particular ebook includes two elements: entity data (which describes the named entity), and one or more entity instances (which describe the various pieces of content within the ebook identified as referencing that named entity). In one embodiment, entity data includes two elements: generic entity data and special entity data. "Generic" entity data is a type of data common to entities of all types, and "special" entity data is a type of data specific to entities of a particular type (e.g., date entities, person entities, or geographic location entities).

In one embodiment, generic entity data includes a type, a description, an overview image, a main URL, related links, and/or related multimedia. The type is the type of the named entity (e.g., date entity, person entity, or geographic location entity). The description describes the named entity and is, for example, an encyclopedia article regarding the named entity. The overview image is an image of the named entity or a related concept (e.g., an image of the person "George Washington" for the person entity George Washington or a map of the United States of America for the geographic location entity United States of America). The main URL is a URL that links to a primary file (e.g., a webpage) that describes or concerns the named entity. The related links are links to secondary files (e.g., webpages) that describe or concern the named entity or related concepts. The related multimedia is multimedia content (e.g., audio, still images, and/or videos) that describes or concerns the named entity or related concepts.

While named entities of all types include this generic entity data, the exact information stored as the generic entity data (e.g., the particular overview image or the particular related links) can differ depending on the type of the named entity. For example, if the named entity is a date entity, then the generic entity data can concern events that occurred on the specified date. For example, if the date entity represents the date "Jul. 4, 1776" then the main URL and/or related links can point to encyclopedia articles regarding the adoption of the Declaration of Independence, which occurred on Jul. 4, 1776.

As another example, if the named entity is a person entity, then the generic entity data can concern profiles of the specified person, summaries of the specified person's life, or multimedia related to the person. For example, if the person entity represents the real person "Larry Page" then the main URL and/or related links can point to social network profiles (e.g., on Google+ or LinkedIn) and/or biographies regarding Larry Page, and the related multimedia can be speeches (e.g., audio or video clips) given by Larry Page.

As yet another example, if the named entity is a geographic location entity, then the generic entity data can concern official or unofficial information regarding the specified geographic location. For example, if the geographic location entity represents the real geographic location "Washington, D.C." then the main URL and/or related links can point to the homepage of the U.S. federal government (official), the homepage of the Washington D.C. convention and tourism bureau (official), user-uploaded pictures of Washington D.C. (unofficial), and/or user recommendations of what to see or do in Washington D.C. (unofficial). The related multimedia can be, for example, a picture/image of the geographic location, a three-dimensional model of the geographic location, or a virtual tour of the geographic location.

Recall that "special" entity data is a type of data specific to entities of a particular type (e.g., date entities, person entities, or geographic location entities). In one embodiment, special entity data for a date entity includes a year, a month, and a day (thereby specifying an exact date). In one embodiment, special entity data for a person entity includes a canonicalized version of the person's name and an indication of whether the person is a real person or a fictional character. In one embodiment, special entity data for a geographic location entity includes a preferred view mode (e.g., street map, satellite view, or street view), an indication of whether the geographic location is a real location or a fictional location, a set of coordinates (e.g., latitude, longitude, altitude, and/or azimuth), and/or a set of geographic names at various resolutions (e.g., county, region, state, city, street (possibly including building number), postal code, and/or point of interest).

Recall that entity information for a particular named entity within a particular ebook includes two elements: entity data (generic and special) and one or more entity instances. An entity instance describes a piece of content within the ebook identified as referencing that named entity. In one embodiment, an entity instance includes a range of ebook content (the particular ebook content that was identified as referencing a named entity; "entity content") and a location of the content range. The content range includes any type of ebook content, such as text and/or multimedia (e.g., audio, still images, and/or video). The location of the content range includes, for example, an ebook indicator (e.g., a volume ID), a page indicator (e.g., a page ID), and a position range that includes a start position and an end position. Each position is an internal marker for a position within an ebook and includes, e.g., a paragraph indicator and an offset within that paragraph. In a graphic novel where there is no text, a position can be specified for each image. The image positions can be used to determine where a content range starts and/or ends so that images within the content range can be indicated. In one embodiment, multiple position types are supported (e.g., text, image, canonical fragment indicators (CFI), EPUB markers, and/or arrays of bounding boxes).

In one embodiment, the entity information repository 129 also includes, for each type of named entity that is referenced in an ebook (e.g., generic entity, date entity, person entity, or geographic location entity), entity summary data at the ebook-level and at the chapter-level. Entity summary data at the ebook-level includes an overview of multiple named entities that are referenced in one ebook. Entity summary data at the chapter-level includes an overview of multiple named entities that are referenced in one chapter of one ebook.

Before an ebook is stored in the ebook repository 122, the ebook is often indexed (e.g., to enable searching functionality). In one embodiment, as the ebook is being indexed, various pieces of content within the ebook are identified as referencing named entities. The process of identifying pieces of content as referencing named entities is sometimes referred to as "named-entity recognition" (NER), "identity identification", or "entity extraction." In one embodiment, the NER process accommodates multiple languages (e.g., by identifying that the text strings "Eiffel Tower" and "Tour Eiffel" reference the same named entity).

After a piece of ebook content is identified as referencing a named entity, that entity content is associated with entity information. For example, an image of George Washington in an ebook (a piece of entity content) is associated with entity information regarding the person entity "George Washington." The associated entity information is then stored in the entity information repository 129. In one embodiment, this association is performed manually. For example, a person views the George Washington image, identifies George Washington person entity information, and associates them. In another embodiment, this association is performed automatically, without human intervention. For example, the George Washington image is identified as being "George Washington" based on metadata associated with the image and/or based on image processing performed on the image. Entity information for "George Washington" is then identified and associated with the image.

The entity information includes entity data and entity instances. In one embodiment, the entity data is generated manually. For example, a person identifies generic entity data (e.g., a description, an overview image, a main URL, related links, and/or related multimedia) and/or special entity data for a particular named entity. In another embodiment, the entity data is generated automatically, without human intervention. For example, databases or web pages are automatically searched for resources related to the particular named entity.

Note that the entity data for a particular named entity (e.g., the George Washington person entity) is not ebook-specific and, thus, can be used for that same named entity in multiple ebooks. In one embodiment, entity data for various entities is stored in a corpus. If the entity data for a particular named entity exists in the corpus, then the stored entity data is used (possibly subject to a staleness timestamp). Alternatively, the entity data for a particular named entity is generated fresh each time an ebook is indexed.

Recall that an entity instance describes a piece of content within the ebook identified as referencing that named entity, including a range of ebook content and its location. In one embodiment, an entity instance is generated automatically, without human intervention. For example, if ebook content is identified as referencing a named entity, then that content (the "range of ebook content") and its location are stored. Unlike entity data, entity instances are particular to each ebook. Also, since entity instances refer to particular locations within an ebook, entity instances are particular to each version of an ebook (e.g., indicated by a volume ID). Therefore, in one embodiment, entity instances are generated fresh each time an ebook is indexed.

In this way, entity information for various named entities referenced within an ebook is obtained. After the entity information for the ebook has been obtained, the entity information is stored within the entity information repository 129. In one embodiment, the entity information repository 129 stores entity information in multiple languages.

After entity information is identified for various named entities in one ebook, entity summary data is generated (e.g., for each type of named entity referenced in the ebook and at both the ebook-level and the chapter-level). The entity summary data is then stored within the entity information repository 129.

Table 2 shows data items that are stored for each instantiation of entity information according to one embodiment.

TABLE 2

| Data Item Name | Data Item Description |
| --- | --- |
| Generic entity data | type of data common to entities of all types; includes, e.g., a type, a description, an overview image, a main URL, related links, and/or related multimedia |
| Last Modified (part of generic entity data) | timestamp of last modification for this generic entity data (if any) |
| Created (part of generic entity data) | timestamp of when generic entity data was created |
| Special entity data | type of data specific to entities of a particular type (e.g., date entities, person entities, or geographic location entities) |
| Entity instance | describes a piece of content within an ebook identified as referencing a named entity; includes, e.g., a range of ebook content and a location of the content range |
| Volume ID (part of entity instance) | the volume (ebook) the entity information is for |
| Page ID (part of entity instance) | the multiple page IDs the entity content can span |
| Before Text (part of entity instance) | the text before the ebook content identified as referencing the named entity (if any) |
| After Text (part of entity instance) | the text after the ebook content identified as referencing the named entity (if any) |
| Associated Ebook Content (part of entity instance) | the ebook content identified as referencing the named entity ("content range") |
| Associated Ebook Text (part of entity instance) | the text portion (if any) of the Associated Ebook Content |
| Style (part of entity instance) | the style information for the Associated Ebook Content (e.g., simple formatting and/or automatic layer launch; "entity content style") |
| Content Range Location (part of entity instance) | start/end position and start/end offset for any of multiple position types (text, image, canonical fragment indicators (CFI), EPUB marker); the range information, including content version, of where the Associated Ebook Content is exactly located for the specified version of the volume |

In one embodiment, the Style data item in Table 2 is implemented as a dictionary object of name/value pairs for the different style attributes. Similarly, the Generic entity data and Special entity data items in Table 2 are each implemented as a dictionary object of name/value pairs for the different pieces of content. The dictionary object is represented as a JSON object in JavaScript.

User layer settings repository 128 includes information concerning which layers a user has "installed." For example, the user layer settings repository 128 includes, for each user ID, a list of layers that user has installed (if any). In one embodiment, the user layer settings repository 128 also includes a default list of installed layers for use with users who are anonymous (e.g., have not logged in). Installation of a layer indicates that the user wants to use that layer at some point in time, although not necessarily all of the time. (An installed layer can be disabled.) Installation of a layer does not indicate that the module for that layer is actually present on client device 140. Since one person can use multiple devices to read ebooks, user layer settings are stored at the repository 120. If a user wants to use a particular layer on a particular client device 140, the module for that layer will need to be present on that device. In one embodiment, a graphical user interface lists layers that are available for installation. The user installs/uninstalls these layers by checking/unchecking various boxes. These settings are then stored in the user layer settings repository 128.

The processing server 130 includes various modules such as an ebook support module 132 for handling ebook-related requests, a server layer support module 134 for handling layer-related requests, a server available-layers module 136 for determining which layers are available, and an available layer data module 138 for determining which layer data is available. In one embodiment, the processing server 130 includes a computer (or set of computers) that communicates with repository 120 and client device 140 and processes data (e.g., by executing the ebook support module 132, the server layer support module 134, the server available-layers module 136, and the available layer data module 138). In one embodiment, the processing server 130 includes a web server that responds to requests from the client device 140.

The ebook support module 132 handles ebook-related requests. Specifically, the ebook support module 132 receives requests from the ereader module 142 and responds to them accordingly. One type of request is for ebook metadata. Another type of request is for ebook content.

The server layer support module 134 handles layer-related requests. Specifically, the server layer support module 134 receives requests from the client layer support module 144 and responds to them accordingly. One type of request is for a list of available layers. Another type of request is for layer data.

The server available-layers module 136 determines which layers are available for a specified user to use with a specified ebook. Specifically, the server available-layers module 136 takes as input a user ID and an ebook ID and outputs a list of layers that are available for the user ID to use with the ebook ID. The server available-layers module 136 uses the user ID to determine which layers the user has installed (stored in the user layer settings repository 128). If a user ID is not provided (e.g., the user is anonymous or has not logged in), then a default list of installed layers is used (stored in the user layer settings repository 128). The server available-layers module 136 uses the ebook ID to determine any layer filtering information such as a blacklist, whitelist, and/or add-list (if any) associated with the ebook (stored in ebook metadata in the ebook repository 122). The server available-layers module 136 then assembles a list of available layers by filtering the list of available layers using the layer filtering information. For example, the filtering may start with the installed layers, keep any layers that are on the whitelist (if a whitelist exists), remove any layers that are on the blacklist and not on the whitelist (if a blacklist exists), and add any layers that are on the add-list (if an add-list exists). (If neither a blacklist nor a whitelist nor an add-list exists, then the assembled list includes all of the installed layers.) In one embodiment, wildcards can be used in the blacklist, whitelist, and/or add-list. For example, a blacklist that contains only a wildcard would cause all layers to be removed (unless the layers are on the whitelist). The server available-layers module 136 outputs the remaining layers as a list of available layers (including layer metadata such as what type of ebook content a particular layer is applicable to and which display modes are supported by a particular layer). Note that this list of layers is ebook-specific.

The available layer data module 138 determines which layer data (e.g., annotations or entity information) is available for a specified user and specified pages of a specified ebook. Specifically, the available layer data module 138 takes as input a user ID, an ebook ID, a content range, and an indication of which type of layer data is desired and outputs layer data that is available for the user ID, the ebook ID, the content range, and the indicated type. The available layer data module 138 uses the user ID, the ebook ID, and the server available-layers module 136 to determine which layers are available for the specified user to use with the specified ebook. The available layer data module 138 then obtains the layer data (stored in the layer data repository 126) associated with the available layers, the specified user, the specified ebook, and the specified content range. If a user ID is not provided (e.g., the user is anonymous or has not logged in), then the available layer data module 138 obtains the layer data (stored in the layer data repository 126) associated with the available layers, "all users" (e.g., anonymous users or the general public), the specified ebook, and the specified content range. The available layer data module 138 then outputs this layer data.

Figure 2:
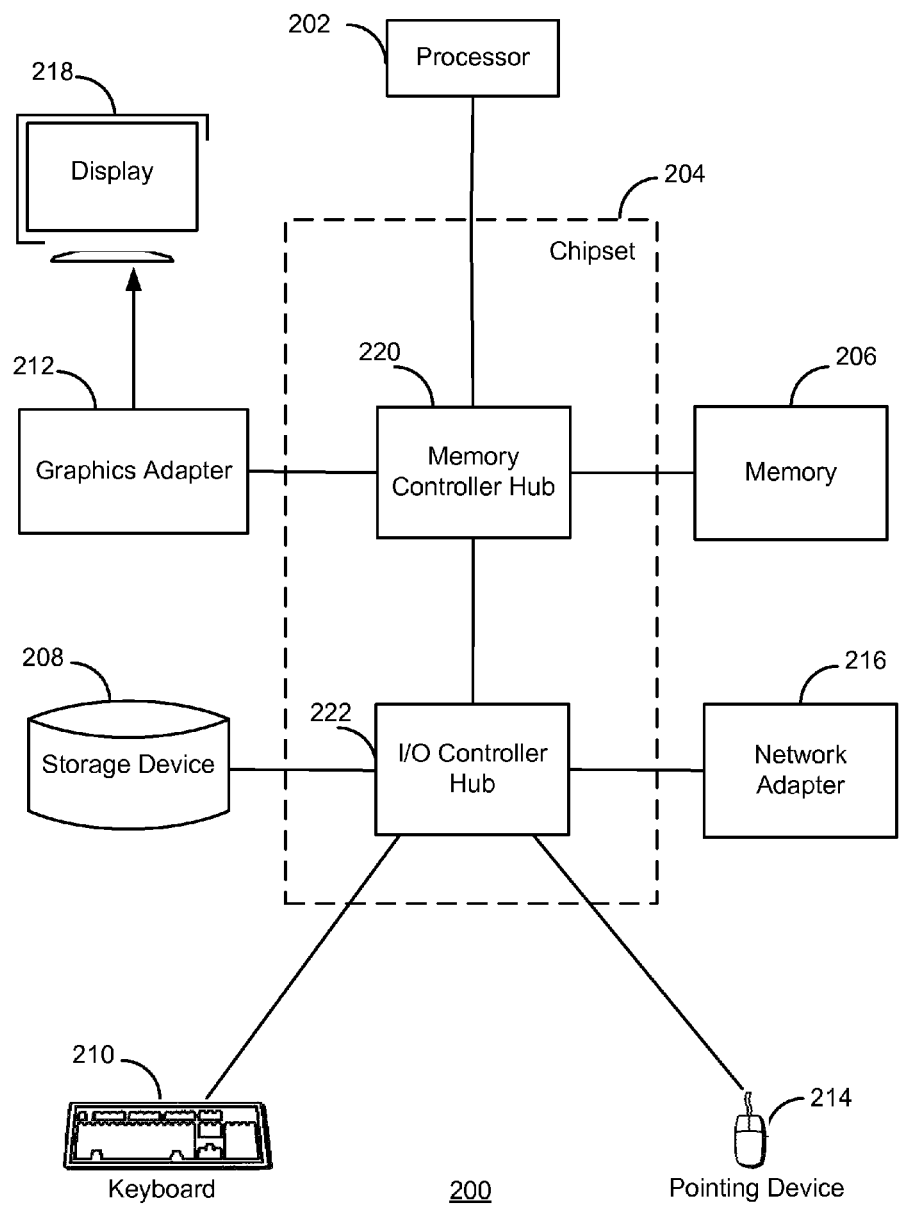
FIG. 2 is a high-level block diagram illustrating an example of a computer for use as a repository, a processing server, and/or a client device, according to one embodiment.

FIG. 2 is a high-level block diagram illustrating an example of a computer 200 for use as a repository 120, a processing server 130, and/or a client device 140 in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120 and/or the processing server 130 can be formed of multiple blade servers and lack a display device, keyboard, and other components, while the client device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
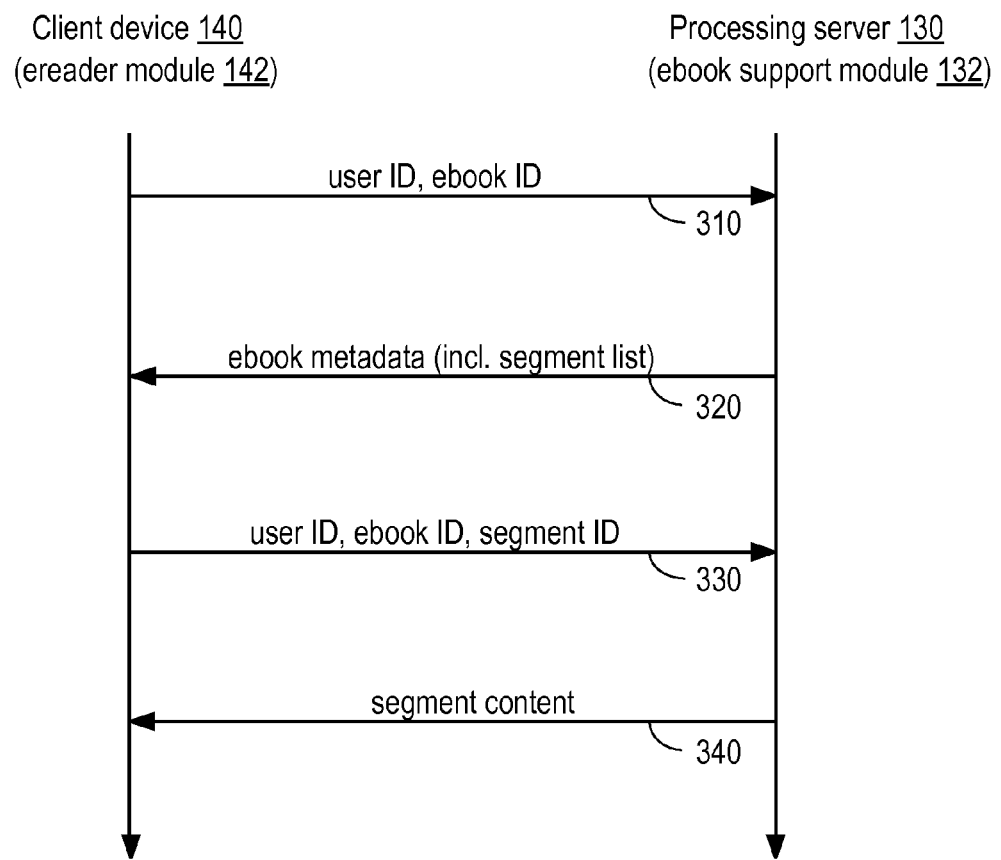
FIG. 3 is a sequence diagram illustrating steps involved in transferring ebook information according to one embodiment.

FIG. 3 is a sequence diagram illustrating steps involved in transferring ebook information according to one embodiment. In step 310, the ereader module 142 associated with the client device 140 sends to the ebook support module 132 associated with the processing server 130 a user ID and an ebook ID. The ebook support module 132 determines (not shown) whether the specified user is allowed to read the specified ebook. If the user is allowed to read the ebook, then in step 320, the ebook support module 132 sends to the ereader module 142 metadata for the specified ebook. That metadata includes, among other things, the list of segments into which that ebook's content is divided.

In step 330, the ereader module 142 sends to the ebook support module 132 a user ID, an ebook ID, and a segment ID. The ebook support module 132 determines (not shown) whether the specified user is allowed to read the specified segment of the specified ebook. If the user is allowed to read the ebook segment, then in step 340, the ebook support module 132 sends to the ereader module 142 content for the specified ebook. That content corresponds to the specified segment. In one embodiment, the segment content is transferred in an encrypted state and then decrypted at the client device 140.

In the embodiment illustrated in FIG. 3, the ebook support module 132 does not send to the ereader module 142 all of the content for the specified ebook at one time. Instead, content is transferred segment by segment (step 340) as each segment is requested (step 330). In this embodiment, the client device 140 must be online so that the ereader module 142 can periodically request and receive segment content (as needed) from the ebook support module 132.

In one embodiment, after the requested segment is sent, additional segments for the same ebook are also sent, even if they have not been requested. This way, if the user tries to view a page outside the requested segment, the appropriate segment might already exist on the client device and need not be requested. If the appropriate segment already exists on the client device, then the reading experience is improved, since the user need not wait for the appropriate segment to be sent to the client device 140. Also, additional segments are available for viewing offline. The additional segments that are sent can, for example, be adjacent to the requested segment (in terms of pages contained therein) or start at the beginning of the ebook and move forward throughout the entire ebook (until all segments have been sent to the ereader module 142). In a different embodiment (not shown), one request from the ereader module 142 to the ebook support module 132 results in the ebook support module 132 sending all of the content for the specified ebook at one time. In this embodiment, the client device 140 need not be online after the initial request and receipt of content.

Figure 4:
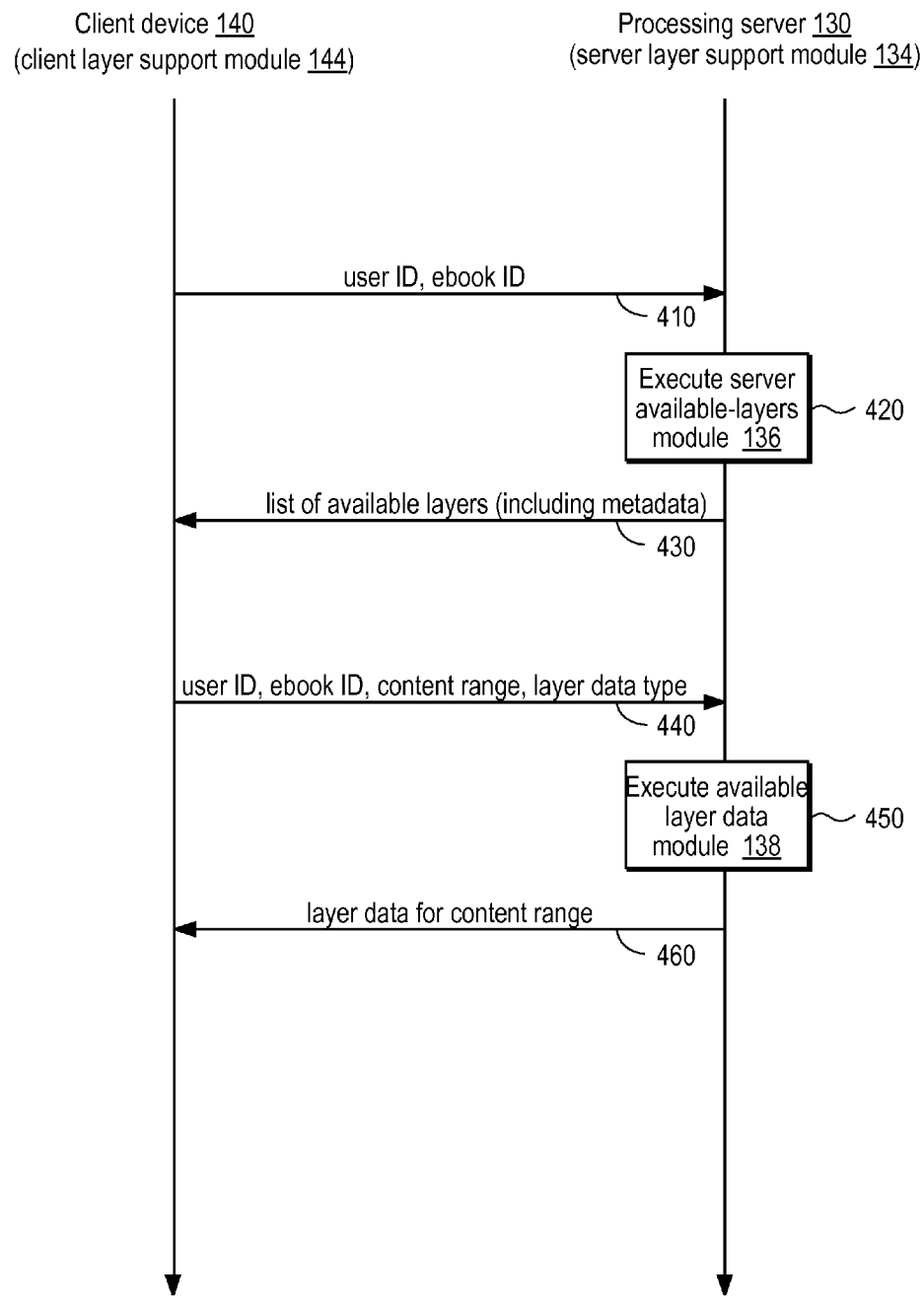
FIG. 4 is a sequence diagram illustrating steps involved in transferring layer information according to one embodiment.

FIG. 4 is a sequence diagram illustrating steps involved in transferring layer information according to one embodiment. In step 410, the client layer support module 144 associated with the client device 140 sends to the server layer support module 134 associated with processing server 130 a user ID and an ebook ID. (The user ID is optional.) The server layer support module 134 executes 420 the server available-layers module 136 to determine which layers are available for the specified user (or anonymous user) to use with the specified ebook. In step 430, the server layer support module 134 sends to the client layer support module 144 a list of available layers. That list includes, among other things, layer metadata such as what type of ebook content a particular layer is applicable to and which display modes are supported by a particular layer. The type of the ebook content can be a data type (e.g., text, image, video, or audio), an annotation type (e.g., the layer that created the annotation), or an entity type (e.g., date, person, or geographic location). One or more of the available layers can be used to display information about named entities.

In step 440, the client layer support module 144 sends to the server layer support module 134 a user ID, an ebook ID, a content range, an indication of which type or types of layer data is desired, and an indication of a desired language. (The user ID and desired language are optional.) The server layer support module 134 executes 450 the available layer data module 138 to determine which layer data (e.g., entity information) is available for the specified user (or anonymous user) and the specified content of the specified ebook. In step 460, the server layer support module 134 sends to the client layer support module 144 layer data for the specified ebook. That layer data corresponds to the specified pages and is in the desired language (if specified and available to the server; otherwise, a default language is used). In one embodiment, if entity information is requested and the specified content range of the specified ebook include two pieces of entity content that reference the same named entity, then only one copy of that named entity's entity data is sent (instead of two), along with two entity instances (one for each piece of entity content).

In one embodiment, after the layer data for the specified content range is sent, layer data for additional content ranges in the same ebook is also sent, even if layer data for those content ranges has not been requested. This way, if the user tries to view a page outside the requested content range, the appropriate layer data might already exist on the client device and need not be requested. If the appropriate layer data already exists on the client device, then the reading experience is improved, since the user need not wait for the appropriate layer data to be sent to the client device 140. Also, additional layer data is available for viewing offline. The additional layer data that is sent can, for example, be adjacent to the requested layer data (in terms of pages that reference it) or start at the beginning of the ebook and move forward throughout the entire ebook (until all layer data has been sent to the ereader module 142). In a different embodiment (not shown), one request from the ereader module 142 to the ebook support module 132 results in the ebook support module 132 sending all of the layer data for the specified ebook at one time. In this embodiment, the client device 140 need not be online after the initial request and receipt of content.

Figures 5, 6:
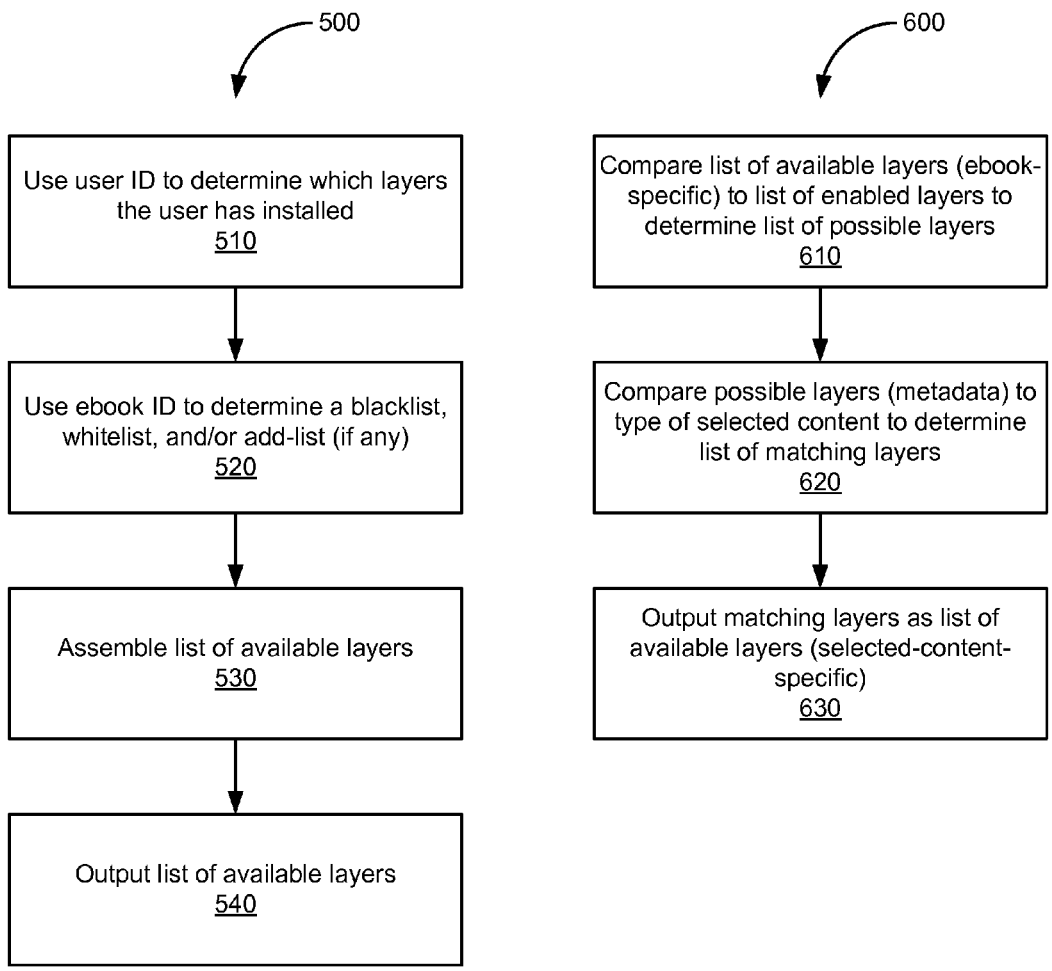
FIG. 5 is a flowchart illustrating a method of determining which layers are available for a specified user to use with a specified ebook according to one embodiment.
FIG. 6 is a flowchart illustrating a method of determining which layers are available to interact with particular ebook content according to one embodiment.

FIG. 5 is a flowchart illustrating a method 500 of determining which layers are available for a specified user to use with a specified ebook according to one embodiment. Other embodiments can perform the steps in different orders and can include different and/or additional steps. In addition, some or all of the steps can be performed by entities other than those shown in FIG. 1.

When the method 500 starts, the client layer support module 144 has already sent a user ID and an ebook ID to the server layer support module 134. The user ID is optional. For example, if the user is anonymous or not logged in, then the no user ID is sent. The server layer support module 134 then provides the (optional) user ID and the ebook ID to the server available-layers module 136. At this point, the method 500 begins.

In step 510, the (optional) user ID is used to determine which layers the user has installed. For example, the server available-layers module 136 queries the user layer settings repository 128 with the user ID. If no user ID is provided, then the server available-layers module 136 queries the user layer settings repository 128 for a default list of installed layers. One or more of the installed layers can be used to display information about named entities.

In step 520, the ebook ID is used to determine a blacklist, whitelist, and/or add-list (if any) associated with the ebook. For example, the server available-layers module 136 queries the ebook metadata with the ebook ID.

In step 530, a list of available layers is assembled. For example, the server available-layers module 136 starts with the installed layers, keeps any layers that are on the whitelist (if a whitelist exists), removes any layers that are on the blacklist and not on the whitelist (if a blacklist exists), and adds any layers that are on the add-list (if an add-list exists). If neither a blacklist nor a whitelist nor an add-list exists, then the assembled list includes all of the installed layers.

In step 540, the remaining layers are output as a list of available layers. For example, the server available-layers module 136 outputs the remaining layers as a list of available layers (including layer metadata such as what type of ebook content a particular layer is applicable to and which display modes are supported by a particular layer). Note that this list of layers is ebook-specific.

FIG. 6 is a flowchart illustrating a method 600 of determining which layers are available to interact with particular ebook content according to one embodiment. Other embodiments can perform the steps in different orders and can include different and/or additional steps. In addition, some or all of the steps can be performed by entities other than those shown in FIG. 1.

When the method 600 starts, the client layer support module 144 has already received a list of available layers (ebook-specific). Also, the particular ebook content has been obtained using a Layer API function provided by the client layer support module 144. Finally, the list of enabled layers has been obtained from the client layer support module 144. At this point, the method 600 begins.

In step 610, the list of available layers is compared to the list of enabled layers. For example, the client available-layers module 146 compares the list of available layers (ebook-specific) to the list of enabled layers to determine a list of possible layers (i.e., layers that are both available and enabled).

In step 620, the type of the particular content is compared to the possible layers. For example, the client available-layers module 146 compares the type of the particular content (e.g., data type, annotation type, or entity type) to the possible layers (specifically, to the layers' metadata, which specifies what type of ebook content can be interacted with using each layer) to determine a list of matching layers (i.e., layers that can be used to interact with the type of the particular content).

In step 630, the matching layers are output as a list of available layers. For example, the client available-layers module 146 outputs the matching layers as a list of available layers. Note that this list of layers is activated-content-specific. A popup menu listing the available layers can then be displayed on the client device 140 and, responsive to the user activating a layer entry from the menu, an instance of that layer can be launched with respect to the particular content (not shown).

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of providing information about content of an electronic book (ebook) that is currently displayed at a client device, comprising:
  receiving, from the client device, an ebook identifier identifying the ebook that is currently displayed at the client device;
  determining, using the ebook identifier, an ebook-specific set of layers available for use with the ebook responsive to stored book layer data indicating layers that are available for the ebook, one or more layers of the ebook-specific set of layers providing one or more types of information associated with one or more types of ebook content at one or more positions in the ebook;
  transmitting, to the client device, an ebook-specific list identifying the ebook-specific set of layers, the client device using the ebook-specific list to:
    identify activated ebook content activated by the user and a position range of the activated ebook content;
    determine, from the identified ebook-specific set of layers, one or more available layers that can be used to interact with the activated ebook content according to a type of the activated ebook content; and
    request the user to select at least one layer from the determined one or more available layers;
  receiving, from the client device, the position range and identification of the at least one selected layer;
  identifying layer information associated with the ebook content identified by the received position range, the layer information identified specific to the identification of the at least one selected layer; and
  transmitting, to the client device, the identified layer information for display in conjunction with the activated ebook content identified by the received position range.

2. The computer-implemented method of claim 1, wherein determining the ebook-specific set of layers available for use with the ebook comprises:
  receiving, from the client device, a user identifier identifying the user of the client device;
  determining a set of user layers available to the identified user;
  filtering the set of user layers based on the stored book layer data to produce the ebook-specific set of layers available for use with the ebook; and
  providing the ebook-specific set of layers available for use with the ebook to the client device.

3. The computer-implemented method of claim 1, wherein the at least one selected layer includes a named entity layer, and identifying the layer information comprises:
  identifying one or more named entities referenced by the activated ebook content identified by the received position range; and
  obtaining entity data for the one or more named entities referenced by the activated ebook content identified by the received position range;
  wherein the identified layer information transmitted to the client device includes the obtained entity data for the one or more named entities.

4. The computer-implemented method of claim 3, wherein obtaining the entity data for the one or more named entities referenced by the activated ebook content comprises:
  obtaining entity data for one or more types of the one or more named entities, the one or more types of the one or more named entities selected from a set of named entity types consisting of: date entities, person entities, and geographic location entities.

5. The computer-implemented method of claim 3, wherein the obtained entity data is for a plurality of types of the one or more named entities and wherein obtaining the entity data comprises:
- obtaining generic entity data common to multiple types of named entities; and
- obtaining special entity data specific to a particular type of named entity.

6. The computer-implemented method of claim 3, wherein obtaining the entity data comprises:
- obtaining entity summary data describing an overview of multiple named entities that are referenced by the activated ebook content.

7. The method of claim 1, wherein the client device is configured to allocate one or more display areas of the client device to display the identified layer information, the one or more display areas allocated according to metadata of the at least one selected layer.

8. A non-transitory computer-readable storage medium storing executable computer program instructions for providing information about content of an electronic book (ebook) that is currently displayed at a client device, the computer program instructions comprising instructions for:
- receiving, from the client device, an ebook identifier identifying the ebook that is currently displayed at the client device;
- determining, using the ebook identifier, an ebook-specific set of layers available for use with the ebook responsive to stored book layer data indicating layers that are available for the ebook, one or more layers of the ebook-specific set of layers providing one or more types of information associated with one or more types of ebook content at one or more positions in the ebook;
- transmitting, to the client device, an ebook-specific list identifying the ebook-specific set of layers, the client device using the ebook-specific list to:
  - identify activated ebook content activated by the user and a position range of the activated ebook content;
  - determine, from the identified ebook-specific set of layers, one or more available layers that can be used to interact with the activated ebook content according to a type of the activated ebook content; and
  - request the user to select at least one layer from the determined one or more available layers;
- receiving, from the client device, the position range and identification of the at least one selected layer;
- identifying layer information associated with the ebook content identified by the received position range, the layer information identified specific to the identification of the at least one selected layer; and
- transmitting, to the client device, the identified layer information for display in conjunction with the activated ebook content identified by the received position range.

9. The non-transitory computer-readable storage medium of claim 8, wherein determining the ebook-specific set of layers available for use with the ebook comprises:
- receiving, from the client device, a user identifier identifying the user of the client device;
- determining a set of user layers available to the identified user;
- filtering the set of user layers based on the stored book layer data to produce the ebook-specific set of layers available for use with the ebook; and
- providing the ebook-specific set of layers available for use with the ebook to the client device.

10. The non-transitory computer-readable storage medium of claim 8, wherein the at least one selected layer includes a named entity layer, and identifying the layer information comprises:
- identifying one or more named entities referenced by the activated ebook content identified by the received position range; and
- obtaining entity data for the one or more named entities referenced by the activated ebook content identified by the received position range;
- wherein the identified layer information transmitted to the client device includes the obtained entity data for the one or more named entities.

11. The non-transitory computer-readable storage medium of claim 10, wherein obtaining the entity data for the one or more named entities referenced by the activated ebook content comprises:
- obtaining entity data for one or more types of the one or more named entities, the one or more types of the one or more named entities selected from a set of named entity types consisting of: date entities, person entities, and geographic location entities.

12. The non-transitory computer-readable storage medium of claim 10, wherein the obtained entity data is for a plurality of types of the one or more named entities and wherein obtaining the entity data comprises:
- obtaining generic entity data common to multiple types of named entities; and
- obtaining special entity data specific to a particular type of named entity.

13. The non-transitory computer-readable storage medium of claim 10, wherein obtaining the entity data comprises:
- obtaining entity summary data describing an overview of multiple named entities that are referenced by the activated ebook content.

14. The non-transitory computer-readable storage medium of claim 8, wherein the client device is configured to allocate one or more display areas of the client device to display the identified layer information, the one or more display areas allocated according to metadata of the at least one selected layer.

15. A computer for providing information about content of an electronic book (ebook) that is currently displayed at a client device, comprising:
- a non-transitory computer-readable storage medium storing executable computer program instructions comprising instructions for:
  - receiving, from the client device, an ebook identifier identifying the ebook that is currently displayed at the client device;
  - determining, using the ebook identifier, an ebook-specific set of layers available for use with the ebook responsive to stored book layer data indicating layers that are available for the ebook, one or more layers of the ebook-specific set of layers providing one or more types of information associated with one or more types of ebook content at one or more positions in the ebook;
  - transmitting, to the client device, an ebook-specific list identifying the ebook-specific set of layers, the client device using the ebook-specific list to:
    - identify activated ebook content activated by the user and a position range of the activated ebook content;
    - determine, from the identified ebook-specific set of layers, one or more available layers that can be used to interact with the activated ebook content according to a type of the activated ebook content; and request the user to select at least one layer from the determined one or more available layers;

receiving, from the client device, the position range and identification of the at least one selected layer;

identifying layer information associated with the ebook content identified by the received position range, the layer information identified specific to the identification of the at least one selected layer; and transmitting, to the client device, the identified layer information for display in conjunction with the activated ebook content identified by the received position range; and a processor for executing the computer program instructions.

16. The computer of claim 15, wherein determining the ebook-specific set of layers available for use with the ebook comprises:

receiving, from the client device, a user identifier identifying the user of the client device;

determining a set of user layers available to the identified user;

filtering the set of user layers based on the stored book layer data to produce the ebook-specific set of layers available for use with the ebook; and providing the ebook-specific set of layers available for use with the ebook to the client device.

17. The computer of claim 15, wherein the at least one selected layer includes a named entity layer, and identifying the layer information comprises:

identifying one or more named entities referenced by the activated ebook content identified by the received position range; and obtaining entity data for the one or more named entities referenced by the activated ebook content identified by the received position range;

wherein the identified layer information transmitted to the client device includes the obtained entity data for the one or more named entities.

18. The computer of claim 17, wherein obtaining the entity data for the one or more named entities referenced by the activated ebook content comprises:

obtaining entity data for one or more types of the one or more named entities, the one or more types of the one or more named entities selected from a set of named entity types consisting of: date entities, person entities, and geographic location entities.

19. The computer of claim 17, wherein the obtained entity data is for a plurality of types of the one or more named entities and wherein obtaining the entity data comprises:

obtaining generic entity data common to multiple types of named entities; and obtaining special entity data specific to a particular type of named entity.

20. The computer of claim 15, wherein the client device is configured to allocate one or more display areas of the client device to display the identified layer information, the one or more display areas allocated according to metadata of the at least one selected layer.

* * * * *